United States Patent [19]
Bochan

[11] 4,086,707
[45] May 2, 1978

[54] CLOTHES DRYER MACHINE AND METHOD

[75] Inventor: John Bochan, Louisville, Ky.

[73] Assignee: General Electric Company, Louisville, Ky.

[21] Appl. No.: 737,834

[22] Filed: Nov. 1, 1976

[51] Int. Cl.² .............................................. F26B 19/00
[52] U.S. Cl. .......................................... 34/48; 34/54; 192/82 T
[58] Field of Search .................... 34/44, 54, 48, 133; 192/82 T, 28, 48.5, 104 C

[56] References Cited
U.S. PATENT DOCUMENTS

| | | | |
|---|---|---|---|
| 3,186,104 | 6/1965 | Stilwell, Jr. | 34/54 |
| 3,286,361 | 11/1966 | Cobb et al. | 34/54 |
| 3,475,831 | 11/1969 | Workman | 34/54 |

Primary Examiner—John J. Camby
Assistant Examiner—Larry I. Schwartz
Attorney, Agent, or Firm—Frederick P. Weidner; Francis H. Boos

[57] ABSTRACT

An improved automatic clothes dryer and method of drying clothes wherein the clothes dryer has a rotatable drum through which heated air is circulated by a blower wheel driven at the full speed of a single speed electric motor. There is a thermostatic switch for sensing the temperature of air exiting the drum and through appropriate controls when a selected predetermined temperature is reached both the temperature at which the air is heated and the volume of air flowing through the drum are reduced. The improved clothes dryer and method reduces the amount of energy utilized by the dryer yet good clothes drying characteristics are accomplished.

5 Claims, 4 Drawing Figures

CLOTHES DRYER MACHINE AND METHOD

BACKGROUND OF THE INVENTION

1. Field of the Invention

This invention relates to an automatic clothes drying machine and the method of drying clothes and more particularly to an improved structure in such machines for effecting the drying of small loads of clothing and the method of drying the same.

2. Description of the Prior Art

Many clothes dryers utilize a horizontal axis rotatable drum for containing the clothes while they are subjected to the drying operation. The clothes are placed in the drum of the clothes dryer and the drum is rotated such that the clothes will be tumbled while heated air flows through the drum and clothes to thereby reduce the moisture content of the clothes.

Clothes dryers have timer arrangements for automatically controlling the machine during its drying run time. Typically a clothes dryer during a drying run has the temperature within the drum remaining relatively low because there is "loose" water readily available to be evaporated by the hot, dry air flowing through the clothes dryer drum. Near the end of the drying run the final moisture in the clothes is retained by capillary action and takes time to come to the surface of the clothes where it is available for evaporation by the hot, dry air. During this time in the drying cycle the temperature within the drum rises. At a present temperature a thermostatic switch is actuated to turn off power to the heaters. The clothes and interior of the drum are then cooled by unheated air flowing through the drum and continues until a reset temperature of the thermostatic switch is reached whereupon the heaters are turned on again. This cycling repeats itself until a present time is used up on the timer. During this cycling period some of the sensible heat in the air flowing through the drum is wasted and eventually vented outside the machine and has thus been unused for drying the clothes.

To save electrical energy and yet accomplish good clothes drying characteristics it is desirable to decrease the volume of the air flowing through the drum the portion of the drying cycle wherein the thermostatic switch is cycling as described above, and at the same time also decrease the temperature at which the air is heated by reducing electrical power to the heaters.

By this invention the above described desirable characteristics of a clothes dryer and the method to accomplish the same may be achieved.

SUMMARY OF THE INVENTION

There is provided an improved automatic clothes dryer having a rotatable drum, means to heat air, and means driven by an electric motor for circulating the heated air through the drum containing clothes to be dried. The improvement includes means for producing a flow of heated air through the drum which includes a blower wheel driven at full speed of the electric motor. There are means for sensing the temperature of the air exiting the drum and means to reduce both the temperature at which the air is heated and the volume of air flowing through the drum at a selected predetermined temperature of the air exiting the drum.

DESCRIPTION OF THE PREFERRED EMBODIMENT

Figure 1:
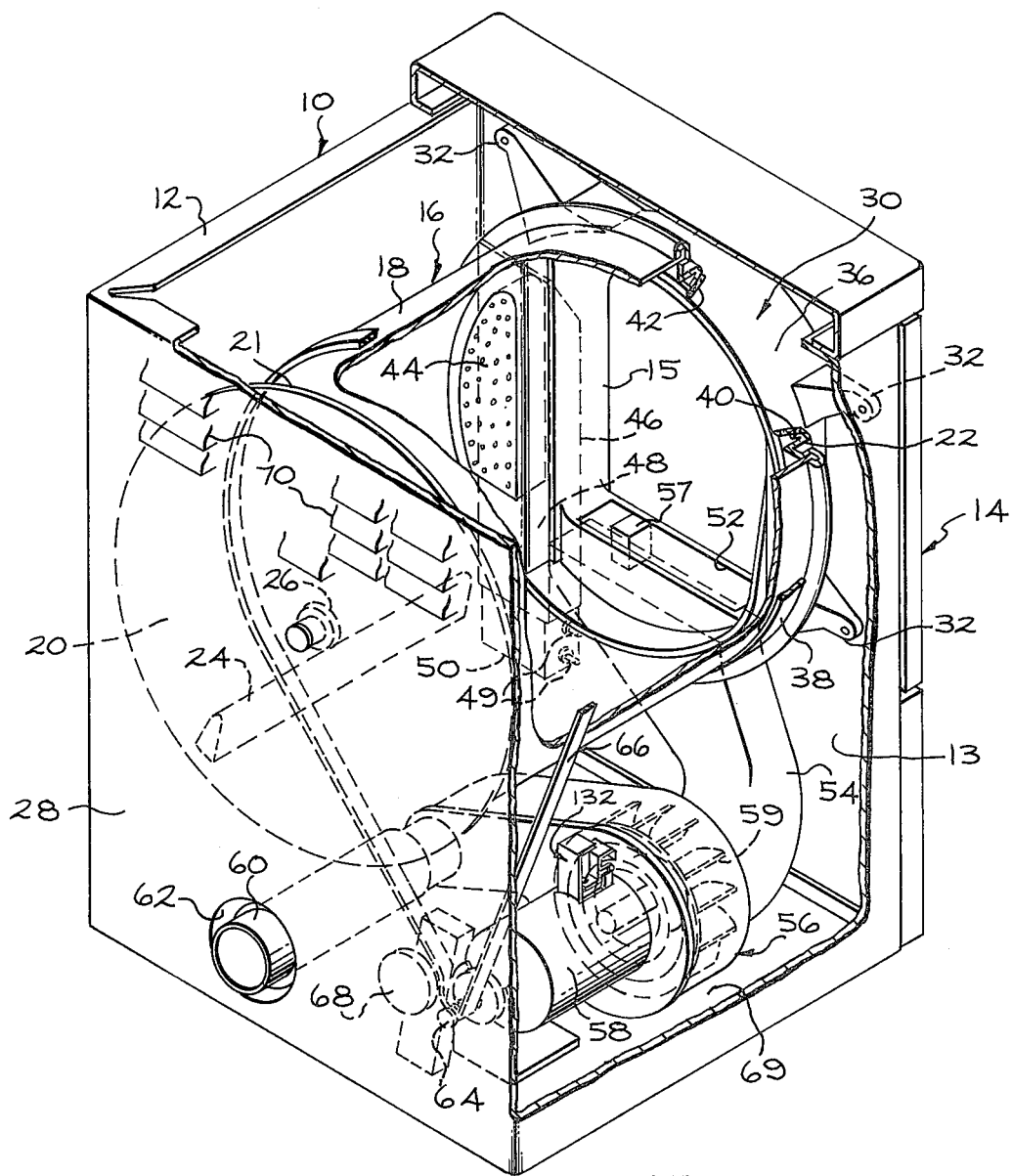
FIG. 1 is a partially cut away perspective of the clothes dryer showing the arrangement of the various machine components and incorporating the preferred embodiment of the invention.

Referring now to the drawings, there is illustrated a clothes dryer 10 including an appearance and protective outer cabinet 12 having an access door 14 which is hingedly secured to the front wall 13 of the cabinet 12. Within cabinet 12 there is provided a clothes tumbling container or drum 16 mounted for rotation about a horizontal central axis. Drum 16 is cylindrical in shape and has a cylindrical side wall 18, a rear circular imperforate wall portion 20 secured to the cylindrical side wall 18 as by a crimped flange generally shown around the periphery of the circular wall portion 20 as 21. The front drum portion 22 is a circular member also secured to the cylindrical side wall 18 by a crimped flange 23 and has a circular opening surrounding an access opening 15. Drum portions 18 and 20 are imperforate while the front of the drum has the access opening 15 for placing in and removing clothes from the drum interior. The access door 14 covers the access opening 15 and seals it when the machine is being operated.

Such clothes dryers are provided with an automatic control so that the operator by manually setting a control knob (not shown) and actuating a second push-to-start switch (not shown) causes the machine to start and automatically proceed through a desired cycle operation. The clothes dryer also has a normally open or "off" switch associated with the door, such that unless the access door is closed the machine cannot be operated. This is a safety switch so that when the door is opened during machine operation, the machine will stop operating and cannot be restarted until the door is closed and the push-to-start switch is again actuated. These controls are not shown or described herein as they are not necessary to understand the invention and they are well known in the trade to which this invention relates.

Around the interior surface of the cylindrical side wall 18 there is a plurality of clothes tumbling ribs or baffles shown generally as 24 so that the clothes are lifted up when the drum rotates and then permitted to tumble back down to the bottom of the drum. The drum 16 is rotatably supported within the cabinet 12 at the rear thereof by a central stub bearing axle assembly 26 that supports the drum at the center of the rear circular wall 20. The axle is secured directly to the rear wall 28 of cabinet 12.

The front of the drum 16 is rotatably supported on a large circular component 30 which has the access opening 15 at the front of the drum. This large circular component 30 may be a plastic molded unitary structure which is secured to the front of the machine by screws or other suitable securing means through support arms 32 integrally molded with the large circular component 30. Located in the bottom or lower portion of the large circular component 30 is a curved channel opening inwardly toward the drum 16 and is formed by an inner circumferential ring 36, and an outer curved segment member 38 spaced from the inner ring 36. The forward end of cylindrical side wall 18 fits inside the channel and rests on two slide members (not shown) each located on the inner surface of the outer curved segment 38 on opposite ends of the segment 38 to slidably support the front portion of the drum 16. In this manner then the drum may be rotated and is supported in its proper position within cabinet 12 at the front by the slide members and at the rear by central stub bearing assembly 26. The front drum portion 22 which is circumferentially secured by crimped flange 23 to the forward portion of the cylindrical wall 18 has secured at its end 40 a suitable flexible circumferential seal member 42 that will by its structure be urged against the outer surface of inner circumferential ring 36 of component 30 to thereby effect a rotatable seal against air flow leakage from the drum.

The large circular component 30 also contains the air inlet opening 44 into the drum. The air inlet opening 44 is in direct communication with duct 46 that is directed vertically upward from beneath the drum 16. Within this duct 46 generally located in portion 48 thereof there is suitable air heating means, such as an electrical resistance heating element having terminal connecting ends 49 for receiving electrical power being supplied to the machine. The lower portion of duct 46 has an opening 50 for receiving ambient air.

In order for the air flow to exit the interior of drum 16 there is provided at the front of the drum and molded into the large circular component 30 an air outlet opening 52. This air outlet is in air flow communication with a blower 56 through duct 54. Air outlet opening 52 is normally fitted with a lint trap or screen member (not shown) covering the air outlet opening for screening lint from the air flow. Within duct 54 there is temperature sensing means such as a thermostatic switch 57 for sensing the temperature of air exiting the drum.

There is also provided within the laundry machine a single speed electric motor 58 for driving the driven components of the machine. The electric motor 58 in the preferred embodiment has a full speed of 1725 RPM, however, other rated single speed electric motors may be used, if desired. The motor shaft extending toward the front of the machine, as shown in the drawings, is connected to a blower wheel 59 contained within the blower assembly 56 for causing the air to flow through the system within the machine. Air leaving the blower assembly 56 may be expelled from the machine through an air conduit 60 that projects through an opening 62 in the rear wall 28 of cabinet 12.

The motor shaft extending toward the rear of the machine has secured to it a belt pulley 64 for driving an endless belt 66 which wraps around the cylindrical side wall 18 of the drum so that the electric motor through the belt pulley and belt cause the drum 16 to be rotated and thereby effect tumbling of the clothes within the drum. To take up any slack in the belt 66 there is a belt tension assembly 68 provided and may be secured to the base 69 of cabinet 12.

The operation of the laundry machine is generally as follows: clothes are placed in the drum by opening the door 14 and passing them through access opening 15 into the interior of the drum 16. When the door 14 is closed, the automatic controls and components of the machine may be energized by setting a control knob and actuating the push-to-start switch causing the electric motor to be energized and thus the blower wheel 59 to rotate at the same speed as the full speed of the electric motor 58, which in the preferred embodiment is 1725 RPM, and produce an air flow through the machine. The drum is also rotated through the belt drive but at greatly reduced velocity due to the difference in circumference between the pulley 64 and the cylindrical side wall 18 of the drum 16. Ambient outside air may be introduced into the interior of the machine through louvers 70 in the rear wall 28 of cabinet 12. The air inside the cabinet enters the bottom opening 50 of duct 46, passes through the heating element area inside duct 48 where it is warmed and then enters the drum 16 through air inlet opening 44. The air will exit the drum at the front thereof through air outlet opening 52. The air will then pass over thermostatic switch 57, through duct 54, blower assembly 56, and exit the machine through air conduit 60. While the clothes dryer described and shown in the drawings has air entering and exiting the drum at the front, this invention may be used with other air flow systems for dryers.

Figure 2:
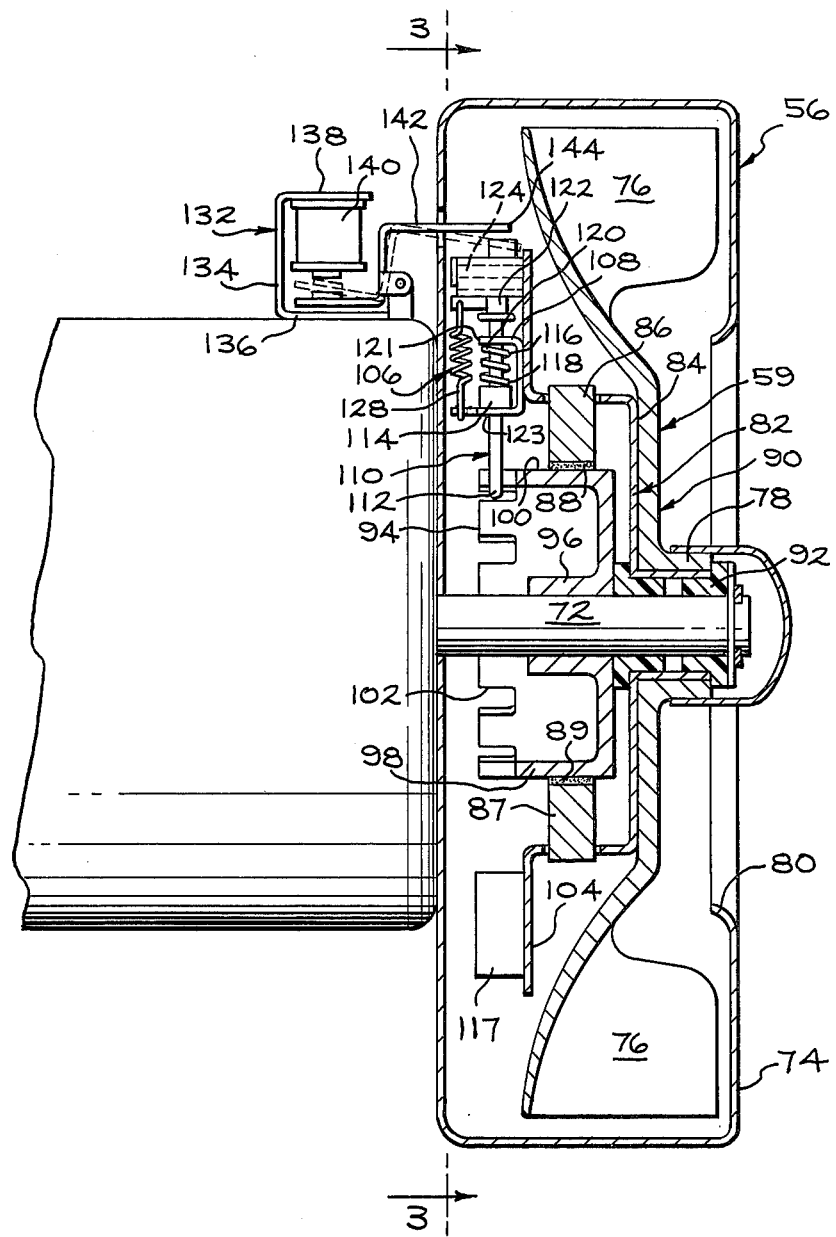
FIG. 2 is a side elevational view partially in section showing the structural arrangement of the preferred embodiment of the invention.
Figure 3:
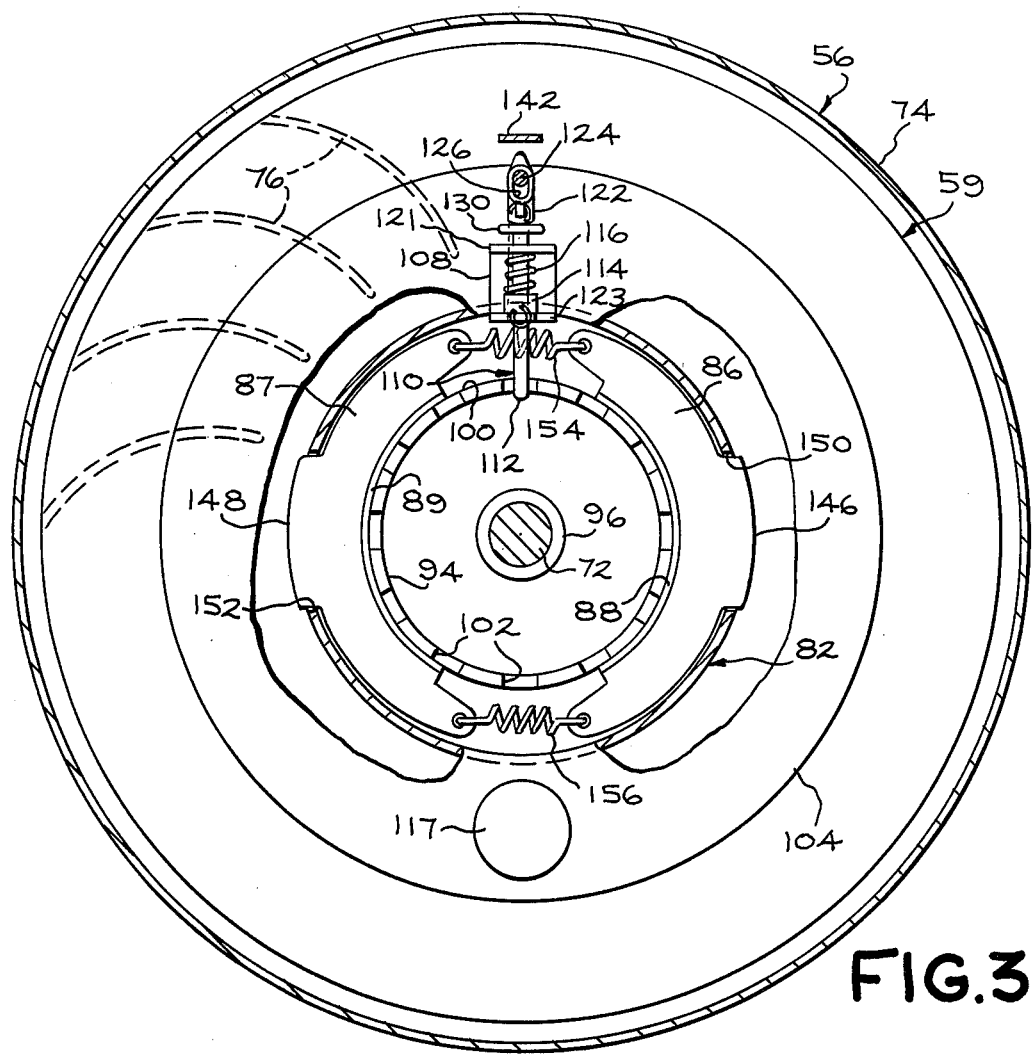
FIG. 3 is a view taken generally along the lines 3—3 of FIG. 2 showing the plunger assembly in engaged position.
Figure 4:
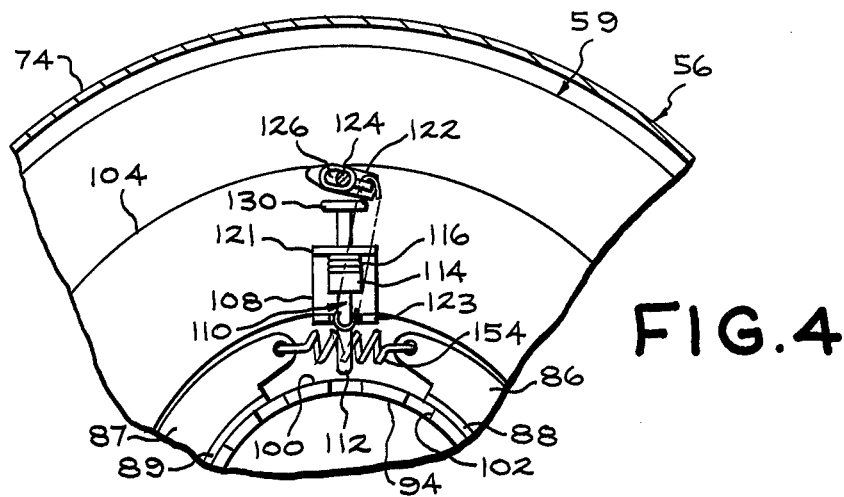
FIG. 4 is a fragmentary view similar to FIG. 3 showing the plunger in its unengaged position.

With particular reference to FIGS. 2, 3 and 4, the improvement in the automatic clothes dryer described heretofore will be described. FIG. 2 shows the blower assembly 56 adjacent to and driven by the electric motor 58. Motor shaft 72 extends from the electric motor 58 into the blower housing 74 which housing encloses therewithin the blower wheel 59 which has a plurality of blades 76 around a central hub 78. The blower housing 74 has a centrally disposed opening 80 for allowing air from duct 54 to enter the housing. Rotation of the blower wheel 59 will induce a flow of air through the machine including the drum 16 and then out through the exit air conduit 60. Secured to the blower wheel 59 is a governor slip shoe assembly 82 including a bracket 84 secured to the blower wheel 59 and governor shoes 86 and 87 having linings 88 and 89 secured to the bracket 84. The blower wheel 59 and the governor slip shoe assembly 82 secured thereto constitute an assembly that has all of its components rotatable in unison. This governor slip shoe and blower wheel assembly designated collectively as 90 is secured to the electric motor shaft 72 by means of a sleeve bearing 92 such that the governor slip shoe and blower wheel assembly 90 may rotate relative to the motor shaft 72.

Located between the electric motor 58 and the governor slip shoe and blower wheel assembly 90 is a clutch drum 94 which has a hub 86 secured to the electric motor shaft 72 for rotation in unison therewith. The clutch drum 94 has a cylindrical depending outer peripheral wall 98 and an outer surface 100 upon which the shoe linings 88 and 89 are in contact. The terminal end of the cylindrical depending wall 98 is provided with a plurality of slots 102 therethrough and spaced around the periphery of the clutch drum.

Secured to an extension arm 104 exending from the governor slip shoe bracket 84 and rotatable in unison therewith is a plunger assembly 106. The plunger assembly 106 includes a U-shaped plunger bracket 108 in which is located a plunger 110 movable axially with respect to the plunger bracket 108. The forward portion 112 of the plunger, extends beyond the plunger bracket 108. Within the legs 121 and 123 of the U-shaped plunger bracket 108 there is a weight 114 secured and movable with the plunger 110. There is also a compression spring 116 which has its one end 118 abutting the weight 114 and the opposite end 120 abutting the one leg 121 of the U-shaped bracket 108. It will be realized that by this construction the plunger 110 may be moved axially relative to the bracket 108. Compression spring 116 acts to bias the plunger 110 in the direction of the clutch drum 94. For balance purposes a counter weight 117, equal to the weight of the plunger assembly 106, is secured to the governor slip shoe bracket 84 diametrically opposite to the plunger assembly 106.

Located remote from the plunger bracket 108 is a stop means which in the preferred embodiment is in the form of a slotted element 122 pivotal about a pivot pin 124 which passes through a slot 126 in the body of the slotted element 122. The slotted element 122 is biased by a spring 128 secured thereto and operable such that when the plunger 110 is biased toward the clutch drum 94 the slotted element 122 engages the rear headed portion 130 of the plunger 110 to thereby stop the plunger from movement in a direction away from the clutch drum. This position is shown in FIG. 3.

A solenoid trip assembly 132 is mounted for non-rotation as by securing it to the electric motor 58 or any other suitable rigid structure. The solenoid trip assembly 132 includes a bracket 134 which is U-shaped and has one leg 136 attached to the electric motor and the other leg 138 has a solenoid 140 attached to it so that the solenoid is positioned between the legs 136 and 138. Pivotally secured to the leg portion 136 of the bracket 134 is a member 142 having an S-shape as viewed in FIG. 2. Member 142 has an end portion 144 movable in response to actuation of the solenoid 140, the purpose of which will be discussed later.

The improved method of drying clothes in an automatic clothes dryer having the above described structural features will now be discussed. In operation then, the machine operator loads the clothes dryer with clothes to be dried and actuates the automatic controls of the machine by operating a control knob which machine will then proceed through a drying cycle determined by the timer run time set by the operator. However, prior to actuation of the machine controls and therefore energization of the electric motor 58, plunger 110 of the plunger assembly 106 will be spring biased by spring 116 in the direction of the clutch drum 94 and weight 114 abuts leg 123 of the bracket 108. This position allows the nose or forward portion 112 of the plunger 110 to extend through one of the slots 102 in the clutch drum 94 and thereby engage the clutch drum 94. Energization of the electric motor 58 will then cause motor shaft 72 to rotate carrying in unison therewith clutch drum 94 and plunger assembly 106. As previously described, the plunger assembly 106 is secured to governor slip shoe bracket 84 which in turn is secured to the blower wheel 59. By this arrangement then as motor shaft 72 rotates the governor slip shoe and blower wheel assembly 90 will be rotated in unison therewith. If, as in the preferred embodiment, the electric motor has a full speed of 1725 RPM, then after a period of time when the motor reaches full speed the blower wheel will also be turning at 1725 RPM.

Simultaneously with energization of the electric motor the means for heating the air, which in the case of the preferred embodiment shown is an electric resistance heater, is also energized. During the drying cycle initially and through a period of the drying cycle the temperatures within the drum remains relatively low because there is "loose" water readily available to be evaporated by the hot dry air flowing through the drum. After a period of time and usually toward the end of the drying cycle when there is a reduced amount of "loose" water the temperature of the air exiting the drum will be increased until it reaches a first value selected and predeterminedly set into the thermostatic switch 57. Upon reaching that temperature the machine controls will turn off the heaters until the air temperature being sensed by the thermostatic switch 57 is reduced to a second selected predetermined reset temperature which is lower than the first value at which time the heaters will be turned on. By this invention when the selected predetermined first temperature value is reached the thermostatic switch acts to simultaneously actuate solenoid 140. Actuation of solenoid 140 will cause S-shaped member 142 to pivot thereby positioning its end portion 144 within the circle scribed by the rotating slotted element 122 so that when slotted element 122 reaches the end portion 144 in its path of rotation it will strike the end portion 144 whereupon its spring bias force is overcome causing the slotted element 122 to pivot about pivot pin 24. Upon pivoting, slotted element 122 no longer acts as a stop means for plunger 110 and plunger 110 is moved outwardly from clutch drum 94 by sufficient centrifugal force exerted by weight 114 to overcome the bias supplied by the compression spring 116. This causes disengagement of the plunger assembly 106 and therefore also the governor slip shoe and blower wheel assembly 90 from the clutch drum 94.

Upon disengagement of the governor slip shoe and blower wheel assembly 90 from the clutch drum 94 rotation of the governor slip shoe and blower wheel assembly 90 is accomplished by the frictional engagement which may be varied between the outer surface 100 of the clutch drum 94 and the shoe linings 88 and 89 which will now be discussed.

The clutching means has a pair of speed responsive or centrifugally operated clutch shoes 86 and 87. Shoes 86 and 87 comprise curved members which are positioned between the clutch drum 94 and the governor slip shoe assembly bracket 84 and include respectively outwardly extending tabs 146 and 148 which fit into openings 150 and 152 in the wall of the governor slip shoe bracket 84. The fit between the tabs and mounting slots 150 and 152 is, however, loose enough so that the shoes may move radially inwardly and outwardly with respect to the clutch drum 94. Shoes 86 and 87 are, as mentioned above, provided respectively with inner frictional surfaces or linings 88 and 89, and are normally biased toward each other by means of tension springs 154 and 156 connected between them so that the linings 88 and 89 engage clutch drum 94. In other words, when the clutch drum is at rest, it is contacted by shoes 86 and 87 under the biasing force of springs 154 and 156.

When the governor slip shoe and blower wheel assembly 90 is disengaged from the clutch drum 94 the centrifugal force created by rotation of the the governor slip shoe bracket 84 begins to reduce the pressure with which the clutch shoe linings 88 and 89 engage the outer surface 100 of clutch drum 94. The mass of the shoes responds to centrifugal force to act against springs 154 and 156, and this opposition to the biasing force of the springs causes the pressure with which the shoes 86 and 87 engage clutch drum 94 to become less.

Thus, the higher the rotational speed of governor slip shoe bracket 84, the smaller is the pressure between the clutch shoes 86 and 87 and the clutch drum 94, and the smaller is the torque which can be transmitted to the governor slip shoe bracket 84. The shoes, in fact, begin to slip with regard to the clutch drum 94 if the speed is increased beyond a certain point, i.e., the shoes are ineffective to maintain the speed of the clutch drum 94 and the load to which the governor slip shoe bracket 84 is connected, namely, the blower wheel 59 and there is a decrease in speed relative to the clutch drum 94. The slippage between the shoes 86 and 87 and the clutch drum 94 causes the blower wheel 59 to be rotated at a speed less than the speed of rotation of the motor shaft 72. Therefore, with a single speed motor there is accomplished two speeds of rotation of the blower wheel 59. By adjusting the shoes 86 for the amount of frictional engagement of the linings 88 with clutch drum 94 any desired rotational speed of the blower wheel relative to the higher motor shaft rotational speed may be accomplished.

After the end of the drying cycle the machine controls de-energize the electric motor and the fan and the governor slip shoe and blower wheel assembly 90 de-accelerate to a point that the centrifugal force acting on the shoes 86 and 87 will be less and the springs 154 and 156 will cause the shoes to engage the outer surface 100 of the clutch drum 94 with more pressure. The centrifugal force exerted on weight 114 is also lessened until the spring 116 extends, moving the plunger toward the clutch drum 94 and into contact with the outer surface 100. Near the final rotation of the clutch drum 94 the plunger will drop through one of the slots 102 in the cylindrical wall 98 of the clutch drum 94. It will then be ready for the next drying cycle wherein the blower wheel will be initially driven at full speed of the electric motor.

By this invention the temperature at which the air is heated is reduced upon reaching a selected predetermined temperature of air exiting the drum and simultaneously the volume of air flowing to the drum is also reduced by slowing down the speed of rotation of the blower wheel. This of course represents an energy savings improvement in clothes dryers and the method of drying clothes yet accomplishes good clothes drying characteristics.

The foregoing is a description of the preferred embodiment of the invention, however, other means of reducing the volume of air flowing to the drum may be accomplished such as by restricting the air flow through the drum rather than reducing the rotational speed of the blower wheel.

It can be appreciated that changes may be made in the disclosed apparatus and method and in the manner in which the apparatus is assembled without actually departing from the true spirit and scope of this invention, as defined in the appended claims.

What is claimed is:

1. In an automatic clothes dryer having a rotatable drum, means to heat air, and means driven by a single speed electric motor for circulating the heated air through the drum, the improvement comprising:
   (a) temperature sensing means for sensing a predetermined selected temperature of the air exiting the drum,
   (b) means to reduce the temperature at which the air is heated upon reaching the selected predetermined temperature,
   (c) a cylindrical clutch drum connected to the electric motor shaft for rotation in unison therewith, said clutch drum having spaced openings around the periphery of the drum,
   (d) a governor slip shoe and blower wheel assembly rotatably secured to the motor shaft for relative movement therewith, said governor slip shoe being arranged to engage the clutch drum periphery with variable frictional force,
   (e) a plunger assembly secured to the governor slip shoe and blower wheel assembly and rotatable in unison therewith, said plunger being operable to engage the clutch drum through the openings around the periphery and be withdrawn from engagement with the clutch drum, and
   (f) means responsive to the selected predetermined temperature to withdraw the plunger from the openings whereby the governor slip shoe and blower wheel assembly will rotate at less speed than the clutch drum.

2. In the automatic clothes dryer of claim 1 wherein the plunger assembly includes the plunger being spring biased to an extended first position to engage the clutch drum prior to rotation of the clutch drum and means to retain the plunger in said position.

3. In an automatic clothes dryer of claim 2 wherein when the stop means is in said second position the plunger is withdrawn from engagement with the clutch drum by centrifugal force exerted by a weight sufficient to overcome the spring bias.

4. In the automatic clothes dryer of claim 2 wherein said plunger is retained in said first position by a two position stop means, said stop means being pivotal from a first position engaging the plunger to a second position not engaging the plunger.

5. In an automatic clothes dryer of claim 4 wherein the stop means is pivoted to said second position by means of actuation of a solenoid energized responsive to said selected predetermined temperature.

* * * * *